（12）United States Patent
Jiang et al.

(10) Patent No.: US 10,170,902 B2
(45) Date of Patent: Jan. 1, 2019

(54) EXTENSION AND RETRACTION DEVICE AND METHOD

(71) Applicant: Panasonic Avionics Corporation, Lake Forest, CA (US)

(72) Inventors: Feng Jiang, Irvine, CA (US); Shrenik Shah, San Clemente, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 15/878,355

(22) Filed: Jan. 23, 2018

(65) Prior Publication Data

US 2018/0351339 A1   Dec. 6, 2018

Related U.S. Application Data

(62) Division of application No. 15/609,620, filed on May 31, 2017, now Pat. No. 9,917,433.

(51) Int. Cl.
| | |
|---|---|
| *B65H 75/48* | (2006.01) |
| *H02G 11/02* | (2006.01) |
| *H01R 13/72* | (2006.01) |
| *H01R 39/08* | (2006.01) |
| *B65H 75/42* | (2006.01) |
| *B65H 75/44* | (2006.01) |

(52) U.S. Cl.
CPC ............. *H02G 11/02* (2013.01); *B65H 75/42* (2013.01); *B65H 75/4471* (2013.01); *H01R 13/72* (2013.01); *H01R 39/08* (2013.01)

(58) Field of Classification Search
CPC ................ H02G 11/02; B65H 75/4434; B65H 75/4442; B65H 2701/34
USPC .............................. 242/378.1, 378, 381, 373
See application file for complete search history.

(56) References Cited

U.S. PATENT DOCUMENTS

| | | | | |
|---|---|---|---|---|
| 6,808,138 B2* | 10/2004 | Liao | ................... | B65H 75/4423 242/378.1 |
| 7,364,109 B2* | 4/2008 | Kuo | ................... | B65H 75/4434 242/373 |
| 7,681,823 B2* | 3/2010 | Chang | ................ | B65H 75/4434 242/378.1 |

* cited by examiner

*Primary Examiner* — Hien Vu
(74) *Attorney, Agent, or Firm* — Brian Furrer

(57) ABSTRACT

An extension and retraction device including a housing and a slip ring mounted within the housing. The slip ring includes a stator and rotor rotatably mounted therein. The rotor includes rotor leads and annular sections defined circumferentially around the rotor. Each rotor lead includes opposite ends with one end electrically connected to one of the annular sections. The stator includes a contact for each annular section in sliding electrical engagement with the annular section. Each contact includes a stator lead having one end electrically connected to the stator and another end extending out of an opening of the housing. A reel is mounted within the housing with the reel and rotor rotatable about a substantially common axis. A cord extending through another opening of the housing is retracted into the housing when the reel rotates in one direction, and the cord is extended from the housing when the cord is pulled and the reel rotates in the opposite direction.

6 Claims, 6 Drawing Sheets

EXTENSION AND RETRACTION DEVICE AND METHOD

CROSS-REFERENCE TO RELATED APPLICATIONS

This application is a division of co-pending U.S. patent application Ser. No. 15/609,620 filed May 31, 2017 and entitled "EXTENSION AND RETRACTION DEVICE AND METHOD," the disclosure of which is wholly incorporated herein by reference in its entirety and for all purposes.

STATEMENT RE: FEDERALLY SPONSORED RESEARCH

Not Applicable.

COPYRIGHT NOTICE

A portion of the disclosure includes material subject to copyright protection. The copyright owner has no objection to the facsimile reproduction by anyone of the patent disclosure as it appears in the Patent and Trademark Office patent file or records, but otherwise reserves all copyright rights whatsoever.

TECHNICAL FIELD

The present disclosure relates generally to devices that retract and extend a cord from the devices, and more particularly to devices for retraction and extension of a cord for use with an entertainment system of a vehicle.

BACKGROUND

Passenger transportation carriers frequently provide entertainment systems on vehicles to alleviate passenger boredom. Vehicles for long-haul trips generally have more elaborate entertainment systems as passenger boredom tends to increase with trip duration and increased entertainment options helps to relieve boredom.

Vehicle entertainment systems, especially on vehicles for longer journeys, frequently include displays mounted at each seat. The displays are for use by passengers to interact with the entertainment system, make content selections, consume content, shop online, and other activities. Such entertainment systems often include a handheld device for each display, typically referred to as a personal control unit (PCU), for facilitating content selection and consumption, submitting requests to vehicle crew, controlling passenger services such as attendant call and reading lights, making purchases through the entertainment system, using the PCU as a game controller or second screen, and other uses.

While a PCU facilitates use of the entertainment system and providing input to entertainment system, most vehicle operators try to prevent loss of the units, especially on larger vehicles that may have hundreds of seats. Loss is normally prevented by tethering each PCU in the vicinity of its respective seat via a cable or cord connecting the unit to the entertainment system. The cord serves a dual purpose. In addition to preventing the PCU from being removed from the vicinity of its respective seat, the cord usually provides data and power to the PCU and connects the PCU in communication with the entertainment system.

While generally effective at preventing loss, the PCU cords have disadvantage in that the cords may hinder passenger entrance and exit from seats by entangling a passenger in a cord. In this regard, passengers typically exit from their seats from time to time during a trip, especially on longer journeys, to use the lavatory, stretch, retrieve or replace items from carryon luggage, visit the galley, speak with passengers at other seat locations, and/or speak with vehicle crew members. Hence, for safety and convenience, the cord is normally extendable and retractable from a spool or reel, with the cord extended while a PCU is being used, and the cord retracted when the PCU is not in use to stow the cord out of the way and reduce the chance of the cord obstructing passenger movement.

While conventional cord devices for providing extension and retraction of a cord have been satisfactory for some situations, improvements are desired, such as reduced weight, size, and/or increased reliability.

SUMMARY OF THE DISCLOSURE

In one aspect, the disclosure describes an extension and retraction device for electrical connection to an entertainment system of a vehicle. The device includes a housing including a pair of openings and a slip ring mounted within the housing. The slip ring includes a rotor and stator with the rotor mounted within the stator and rotatable therein. The rotor includes rotor leads and electrically conductive annular sections defined circumferentially around the rotor. Each rotor lead includes opposite ends with one end electrically connected to one of the annular sections. The stator includes a contact for each annular section in sliding electrical engagement with the annular section. Each contact includes a stator lead having one end electrically connected to the stator and another end extending out of one of the openings of the housing for electrical connection to the entertainment system.

The extension and retraction device includes a reel mounted within the housing in which the reel and rotor of the slip ring are each rotatable about a substantially common axis. The device includes a cord extending through the other of the pair the openings of the housing. The cord includes a distal end and a proximal end, with the cord being retracted into the housing when the reel rotates in one direction to wind the cord around the reel. The cord is dispensed or extended from the housing when the cord is pulled and the reel rotates in the opposite direction to unwind the cord from the reel. The cord includes internal wires extending lengthwise along the cord from the proximal end to the distal end, with at least some of the internal wires extending from the proximal end of the cord and being electrically connected to the rotor leads of the slip ring.

In another aspect, the extension and retraction device further includes an enclosure in which the slip ring is enclosed with the stator leads extending through the enclosure. In a further aspect, the slip ring includes at least four stator leads. One lead corresponds to power, one lead to ground, and a pair of leads correspond to communication pathways for data. In yet another aspect, the slip ring is compatible with at least one USB standard for communicating data from the cord to entertainment system.

In another further aspect, the extension and retraction device includes a sprocket connected to the reel, with the reel including a slot guiding the rotor leads from the slip ring to a location proximate the proximal end of the cord. In a still further aspect, the sprocket includes an outer periphery having notches defined there around. The extension and retraction device further includes a slider moveable between first and second positions within the housing in which the slider at one of the positions engages a notch in the sprocket preventing rotation of the sprocket, and in the other position permits the sprocket to rotate.

In a different aspect, the disclosure describes a method for providing a retractable and extendable electrical connection to an entertainment system of a vehicle. The method includes providing in the vehicle, a housing including a pair of openings. The method also includes mounting a slip ring within the housing in which the slip ring includes a rotor, and rotor and stator leads, and extending the stator leads out of one of the openings of the housing and connecting the stator leads to the entertainment system of the vehicle. The method additionally includes rotatably mounting a reel within the housing with the reel having an axis of rotation along that of the rotor in which the reel is rotatable in opposite directions. The method also includes providing a cord including opposite ends and internal wires, and extending one end of the cord through the other of the pair of openings of the housing and connecting at least some of the wires to the rotor leads. For retracting and extending the cord, the method includes retracting the cord into the housing by rotating the reel in one direction to wind the cord onto the reel, and extending the cord from the housing by pulling the cord to rotate the reel in the other direction and unwinding the cord from the reel, i.e., dispensing the cord from the reel.

In a further aspect, the method includes attaching a sprocket to the reel with the sprocket rotatable with the reel, and the sprocket including an elongate aperture. This further aspect includes inserting the rotor leads into the elongate aperture and using the elongate aperture to guide the rotor leads from the slip ring to a location in the vicinity of the foregoing end of the cord. In a still further aspect, the method includes connecting a resiliently deformable member to the reel in which the resiliently deformable member biases the reel to rotate in a direction retracting the cord.

In another aspect, the method includes encapsulating the slip ring. Encapsulating the slip ring further includes placing the slip ring in an enclosure with the stator leads extending from the enclosure. In yet another aspect, mounting the slip ring includes using a slip ring compatible with at least one USB standard for communicating data from the cord to the IFE system. In another aspect, the method includes connecting the other end of the cord to a personal control unit.

In a different aspect, the disclosure describes an extension and retraction device for electrical connection to an entertainment system of a vehicle. The device includes a housing including a pair of openings, and a slip ring mounted within the housing. The slip ring includes rotor leads and stator leads in which the stator leads extend out of one of the openings of the housing for electrical connection to the entertainment system. The device also includes a reel mounted within the housing in which the reel and rotor of the slip ring are each rotatable about a substantially common axis. The device additionally includes a cord extending through the other of the pair of openings of the housing.

The cord includes a distal end and a proximal end, in which the cord is retracted into the housing when the reel rotates in one direction to wind the cord around the reel. The cord is dispensed/extended from the housing when the cord is pulled and the reel rotates in the opposite direction to unwind the cord from the reel. The cord includes internal wires extending lengthwise along the cord from the proximal end to the distal end, with at least some of the internal wires extending from the proximal end of the cord and electrically connected to rotor leads of the slip ring. The device includes a sprocket connected to the reel and rotatable therewith, and the reel including a guide into which the rotor leads extend from the slip ring to a location proximate the proximal end of the cord. In a further aspect, the sprocket includes an outer periphery having notches defined there around. In this further aspect, the extension and retraction device also include a slider moveable between first and second positions within the housing in which the slider at one of the positions engages a notch in the sprocket preventing rotation of the sprocket, and in the other position permits the sprocket to rotate.

In a different further aspect, the slip ring includes a rotor and stator with the rotor mounted within the stator and rotatable therein and the rotor leads extending from the rotor into the guide, in which the guide includes a slot formed in the sprocket. Further still in this aspect, the rotor includes electrically conductive annular sections defined circumferentially around the rotor, with each rotor lead including an end electrically connected to one of the annular sections. In yet a different further aspect, the stator includes a contact for each annular section in sliding electrical engagement with the annular section. Further in the foregoing aspect, each stator lead includes an end electrically connected to a contact.

Other aspects and advantages will become apparent from the following description, taken in conjunction with the accompanying drawings.

BRIEF DESCRIPTION OF THE DRAWINGS

The various features of the present disclosure will now be described with reference to the drawings of the various aspects disclosed herein. In the drawings, the same components may have the same reference numerals. Note that the drawings are not intended to be to scale or show actual quantities of components or relative sizes. The illustrated aspects are intended to illustrate, but not to limit the present disclosure. The drawings include the following figures.

DETAILED DESCRIPTION

Figure 1:
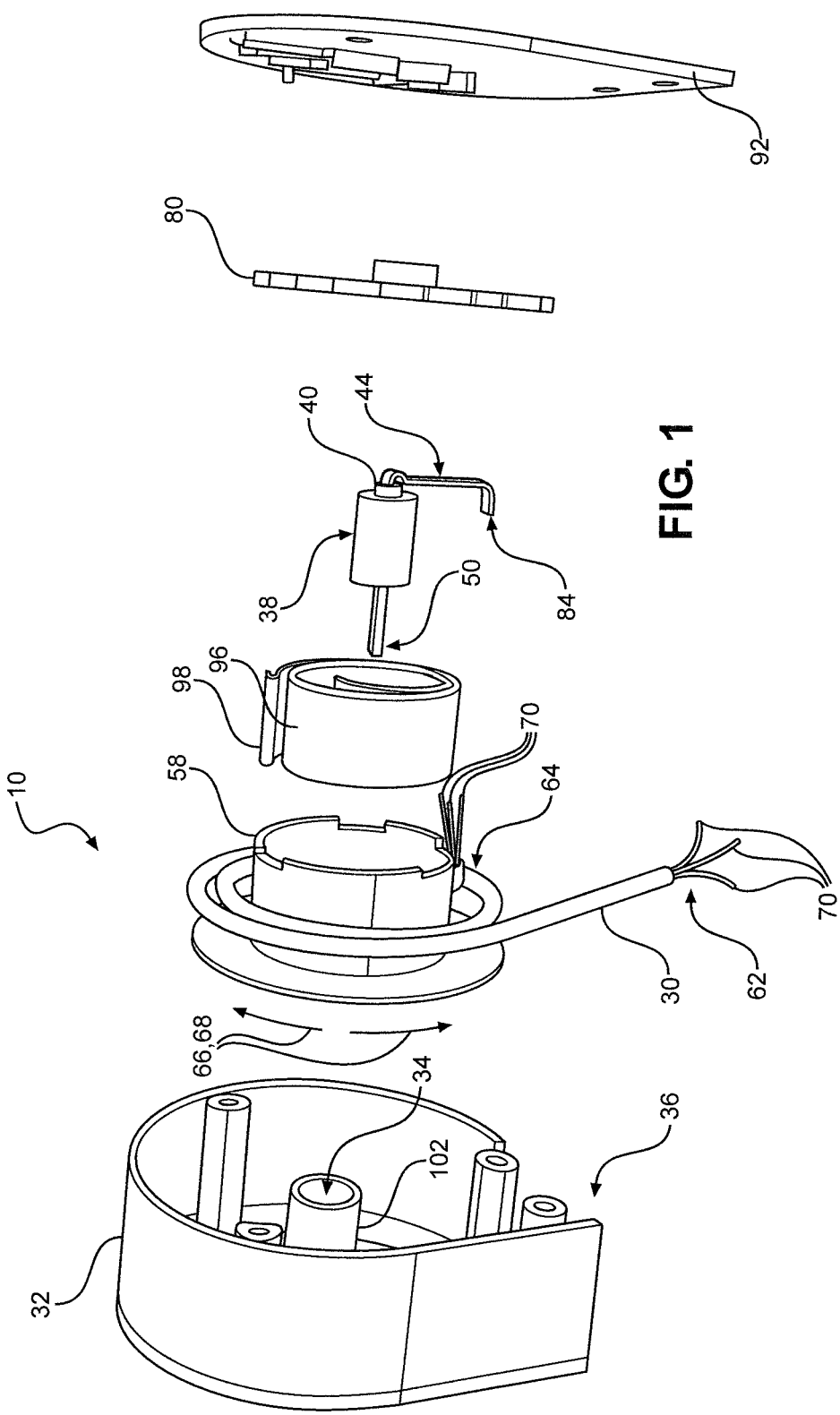
FIG. 1 is a schematic illustration of an extraction and retraction device in a partially exploded view.
Figure 2:
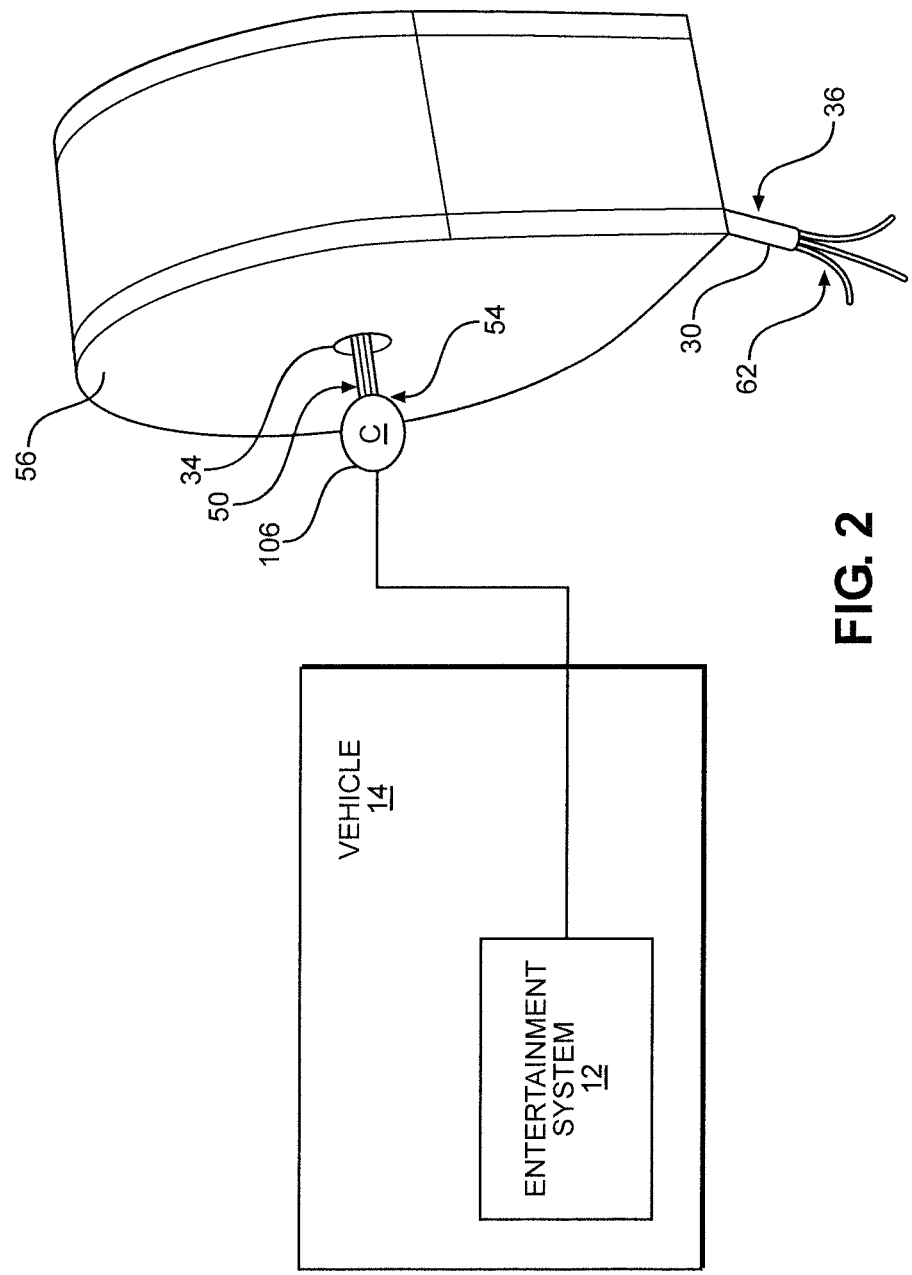
FIG. 2 is a view of the components of the extraction and retraction device of FIG. 1 assembled and a schematic illustration of a vehicle having an entertainment system for connection of the device thereto.

In one aspect, the following disclosure describes an extension and retraction device 10 as schematically illustrated in FIG. 1. FIG. 1 shows the device 10 in a partially exploded view to illustrate internal components for more convenient description thereof with reference to the drawing figures. As schematically illustrated in FIG. 2, the device 10 is intended for providing an extendable and retractable electrical and physical connection to an entertainment system 12 of a vehicle 14, such as an airplane, ship, train, ferry, bus, or other type of vehicle having an entertainment system for use by passengers.

Figure 3:
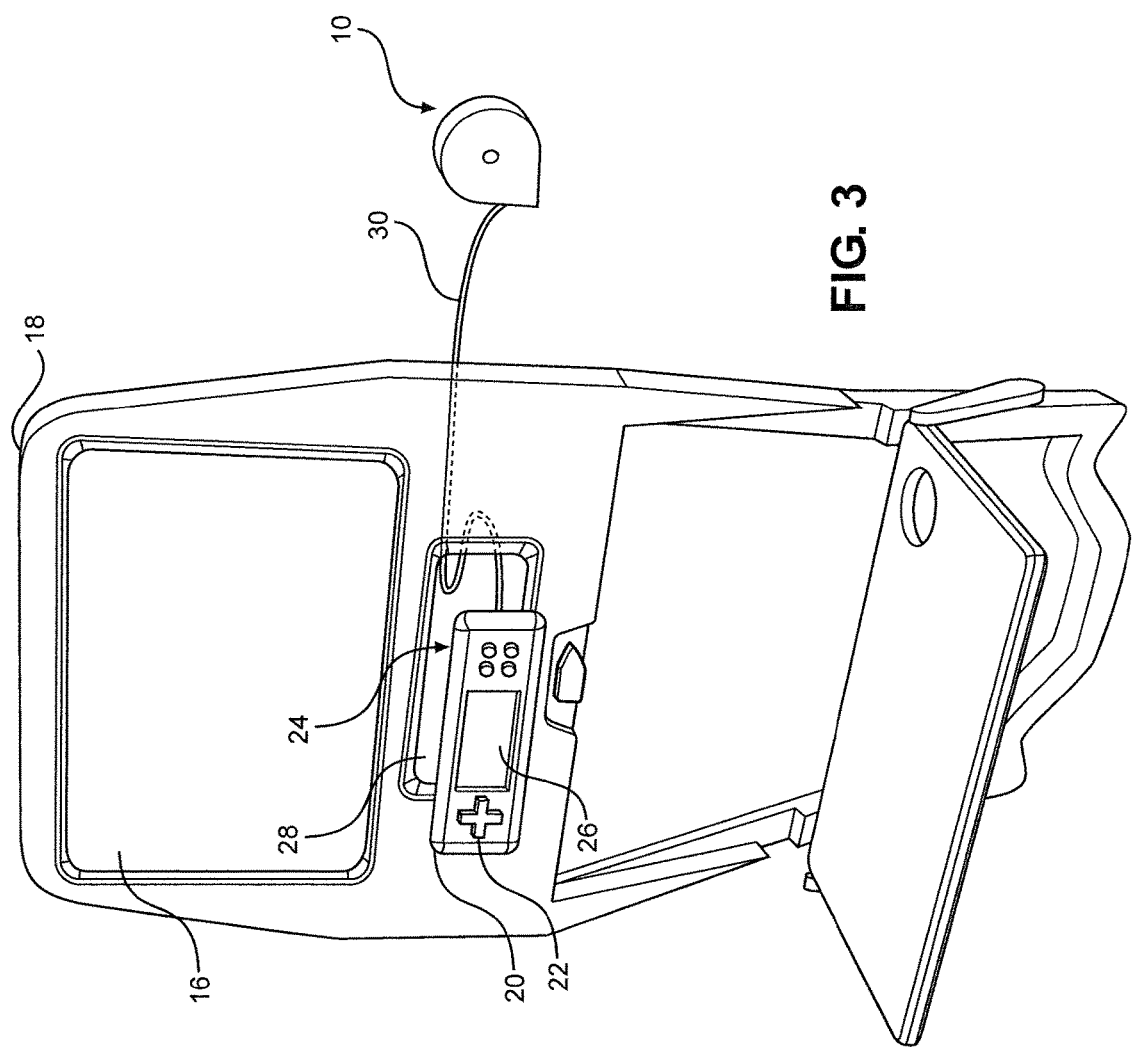
FIG. 3 is a schematic illustration of a portion of a seat of a vehicle and the device of FIG. 1 assembled and connected to a personal control unit.

The entertainment system 12 may be installed on a vehicle 14 in which the entertainment system includes monitors 16 installed at seats 18 in the vehicle as shown in FIG. 3, schematically illustrating part of a seat 18. The monitors 16 may be mounted to the back of the seats 18 as shown in FIG. 3, to an armrest of a seat, bulkhead, wall, ceiling, or other location. Passengers use the monitors 16 to select and consume content from the entertainment system 12. The monitors 16 provide access to content such as games, communication applications (e.g., telephone service, VoIP, messaging, etc.), Internet browsing, and other computer applications, depending upon the capabilities of the entertainment system 12. Such monitors 16 are often referred to as smart monitors due to the inclusion of an operating system, the ability to install and execute computer applications, the ability to process and store data, and other capabilities.

Some entertainment systems 12 include one or more servers connected in communication via a network with the monitors 16. The server 12 stores content with which a monitor 16 may be used to select content, such as a film, TV program, music, etc., and thereafter stream the content to the monitor 16 for consumption by a passenger. Alternatively or in addition to a server, content may be stored in media included with each monitor 16, such as in flash memory, an SSD (solid state drive), magnetic disk drive, or in another component of the entertainment system 12, accessible by each monitor 16 over a network, for example, in network attached storage (NAS), seat boxes, or on another monitor or monitors 16.

As shown in FIG. 3, an entertainment system 12 will frequently include a personal control unit (PCU) 20 for each monitor 16 to facilitate passenger consumption of content and interaction with the entertainment system 12. For example, the PCU 20 may be used to navigate, select, and consume content available via the entertainment system 12. While the monitors 16 may include a touch screen for passengers to select and consume content, the PCU 20 enables a passenger to more efficiently input data and/or commands for various software applications available via the monitor, such as games, e-mail applications, web browser applications, messaging applications, and so forth. For example, the PCU 20 may include a directional or digital pad 22 for providing input for games, buttons 24 for input selections, and a touch-pad 26 for manipulating a cursor on the monitor 16 and navigating available content.

The PCU 20 is generally provided in a hand-held form factor with the PCU removably mounted or docked in a recess 28 or other type of mount in the vicinity of the monitor 16. Removably mounting the PCU 20 enables the passenger to more easily use the PCU for providing input and allows additional types of input methods to be provided on other surfaces of the unit, such as a keypad on the reverse side of the unit, a magnetic strip reader along one edge, additional buttons, and types of methods for efficient use of surface space of the PCU. For use with games and providing tactile feedback to a passenger, the PCU may include position sensors for determining the orientation of the unit and vibrators for haptic feedback to the passenger.

The extension and retraction device 10 includes a cord 30, which may be used to provide electrical power to each PCU 20 when the PCU is docked or undocked. In particular, the cord 30 is extendable and retractable and extends from the device 10 when the PCU 20 is removed from its dock. In addition to an electrical connection, the cord 30 provides a physical connection to maintain the PCU in the vicinity of the seat 18 to help prevent loss or misplacement of the PCU 20.

Figure 4:
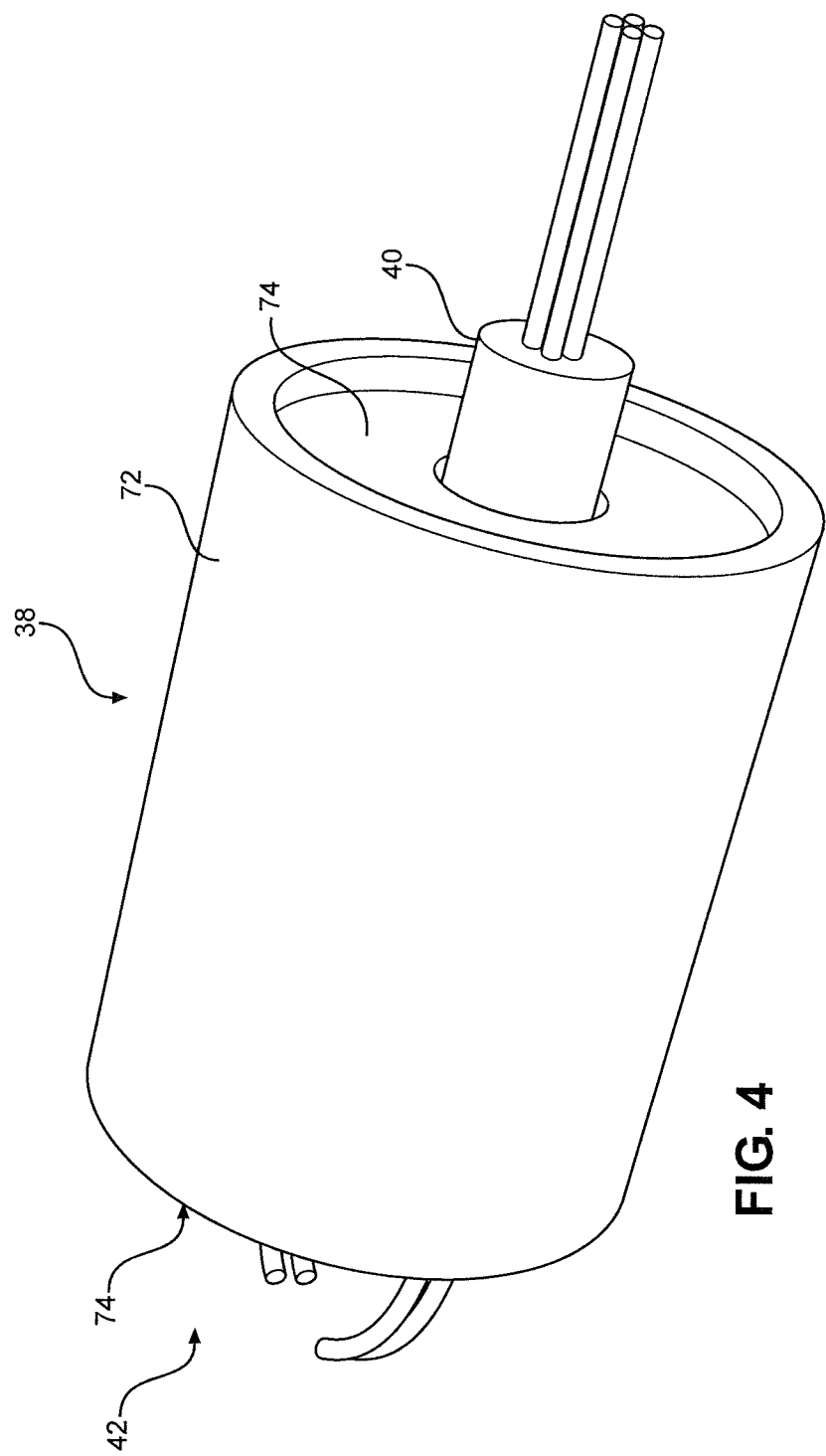
FIG. 4 is an enlarged schematic illustration of a slip ring of the device of FIG. 1.
Figure 5:
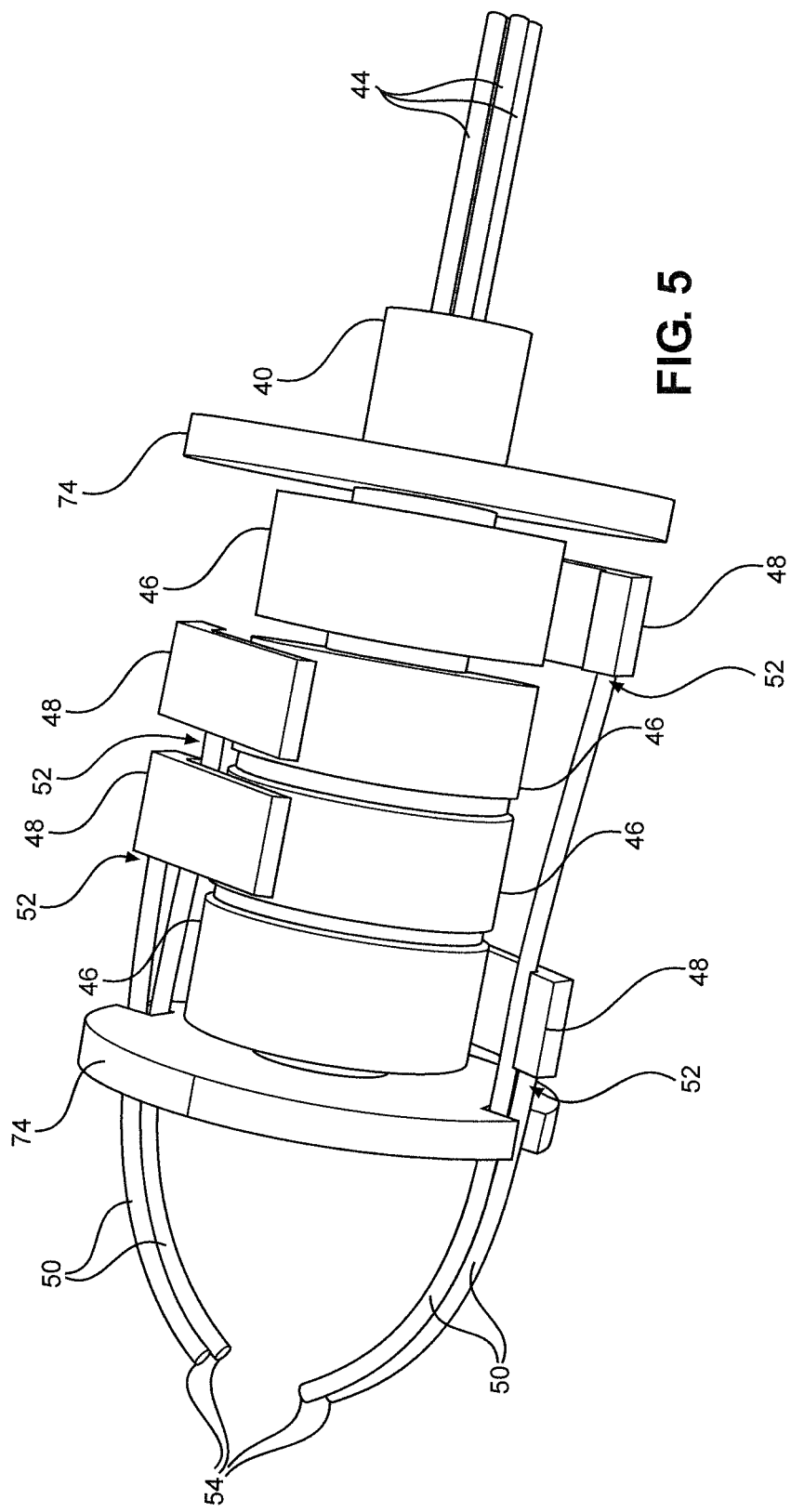
FIG. 5 is a schematic illustration of a portion of the slip ring of FIG. 4.

Returning to FIG. 1, the extension and retraction device 10 includes a housing 32 having a pair of openings 34 and 36. The device 10 includes a slip ring 38 mounted within the housing 32. FIG. 4 schematically illustrates an enlarged view of the slip ring 38 removed from the device 10. As illustrated in FIG. 4, the slip ring 38 includes a rotor 40 with the rotor 40 mounted within a stator 42 and being rotatable within the stator about the central axis of the rotor. FIG. 5 schematically shows a portion of the interior of the slip ring 38. With continued reference to FIG. 5, the rotor 40 includes rotor leads 44 and electrically conductive rings or annular sections 46 defined circumferentially around the rotor. Each rotor lead 44 extends through the rotor 40 and electrically connects to one of the annular sections 46. Specifically, each rotor lead 44 includes opposite ends with one end electrically connected to one of the annular sections 46, such that there is a rotor lead corresponding to each annular section.

The stator 42 includes a contact 48 for each annular section 46, with each contact in sliding electrical engagement with the annular section, i.e., the contact slides over the annular section 46 of the rotor 40 as the rotor rotates. In particular, there is a contact 48 corresponding to each annular section 46, with the contact maintaining sliding electrical engagement with its respective annular section. Each annular section 46 is formed of a material having good electrical conductivity and wear characteristics for long use, such as a metal, metal alloy, carbon, graphite, other suitable material, or a combination thereof. Moreover, at least the portion of each contact 48 engaging the annular section is formed of the same or similar material such that electricity can be conducted from each annular section 46 to its respective contact 48 and vice-versa with low resistance. A spring or other resiliently deformable member is employed to bias each contact 44 to remain in engagement with its respective annular section 46.

Each contact 48 includes a stator lead 50 having one end electrically connected to the stator 42. In particular, the one end 52 of the stator lead 50 electrically connects to the contact 48, such that a stator lead 50 extends from each contact. Referring to FIG. 1, the other end 54 of each stator lead 50 extends out of one of the openings 34 and 36 of the housing 32 for electrical connection to the entertainment system 12. With reference to FIG. 2, the other end 54 of each stator lead 50 extends out of the opening 34 formed centrally in one side 56 of the housing 32, i.e., the opening lying along the longitudinal axis of the slip ring 38.

Returning to FIG. 1 again, the extension and retraction device 10 includes a spool or reel 58 mounted within the housing 32. The reel 58 is mounted rotatably in which the reel, and rotor 40 of the slip ring 38 each rotate about a substantially common axis lying along the longitudinal axis of the rotor 40.

The extension and retraction device 10 includes the cord 30, which extends through the other opening 36 of the pair of openings 34 and 36 in the housing 32. The cord 30 includes a distal end 62 and a proximal end 64, with the distal end extending out of the housing 32. The reel 58 is rotatable in opposite directions 64 and 66, with the cord 30 being retracted into the housing 32 when the reel rotates in one direction 66 to wind the cord around the reel, and the cord being dispensed or extended from the housing when the cord is pulled and the reel rotates in the opposite direction 68 to unwind the cord from the reel.

The cord 30 includes internal wires 70 extending lengthwise along the cord from one end 62 or 64 to the other end of the cord. At least some of the external wires extending from extend from the proximal end 64 of the cord 30 and are electrically connected to the rotor leads 50 of the slip ring 38. Depending on the application, there may be one or more internal wires 70 that are not used. For example, the cord 70 may include a sufficient quantity of internal wires to meet a later USB standard, but used in accordance with an earlier USB standard in which fewer wires are necessary, e.g., USB 3.0 versus USB 2.0.

The extension and retraction device 10 may be used on a vehicle 14 that does not include monitors 16, in which passengers must supply their own content for entertainment, such as games, films, audio, and/or communication applications on a personal electronic device (PED) carried aboard the vehicle by the passenger, such as a phone, tablet computer, phablet (combination phone and tablet), laptop, or other information processing apparatus. The extension and retraction device 10 in this application may be used to connect to the vehicle electrical system and provide charging power for passengers PEDs. In particular, internal wires 70 of the distal end 62 of the cord 30 may be connected to a USB port, to provide an extendable and retraction charging outlet for passengers to more conveniently charge a PED. In this application, internal wires typically used for data connections are not necessary, and only power and ground connections may connected/used.

The entertainment system 12 receives power from a source in the vehicle 14, such as an outlet connected to the electrical system of the vehicle. The entertainment system 12 receives the power from the vehicle 14 and distributes the power among passenger seats 18 on the vehicle, typically a group or row of seats to power items at each seat, for example, a reading light, attendant call light, monitor 16, outlets, and other items. On an aircraft, generally the vehicle 14 generates AC power at around 115 VAC, and converts the power to 28 VDC for distribution to the vehicle electrical system and items connecting thereto, such as the entertainment system 12. The entertainment system 12 receives the vehicle power and distributes it to various components thereof, via seat boxes and/or seat power modules, which further distribute the power and may also convert the power to other voltages for use at each seat 18, such as USB outlet and/or types of outlet, e.g., an AC outlet for charging a laptop computer. On aircraft the entertainment system is frequently referred to as an IFE (infight entertainment) system or an IFEC (inflight entertainment and communication) system.

For compatibility with at least the USB 2.0 standard, the slip ring 38 includes at least four stator leads 50, one lead for power, one for ground, and another pair of leads for communicating data signals, i.e., communication pathways for data, typically with the wires twisted around one another to minimize interference. Likewise, there is a corresponding quantity of rotor leads 44, and internal wires 70 in the cord 30. The cord 30 may include an additional ground wire and a shield surrounding other internal wires 70 along the cord for electromagnetic interference (EMI) suppression.

With reference to FIG. 4, the slip ring 38 includes a capsule or enclosure 72 enclosing the rotor 40 and stator 42 in a cylindrical shell in which the enclosure includes a cap 74 at one end of the cylindrical shell. The rotor 40, and rotor leads 44 therein, extend through one of the caps 74 at one end of the enclosure 72, and the stator leads 50 extend through the cap 74 at the opposite end (see FIG. 5).

Figure 6:
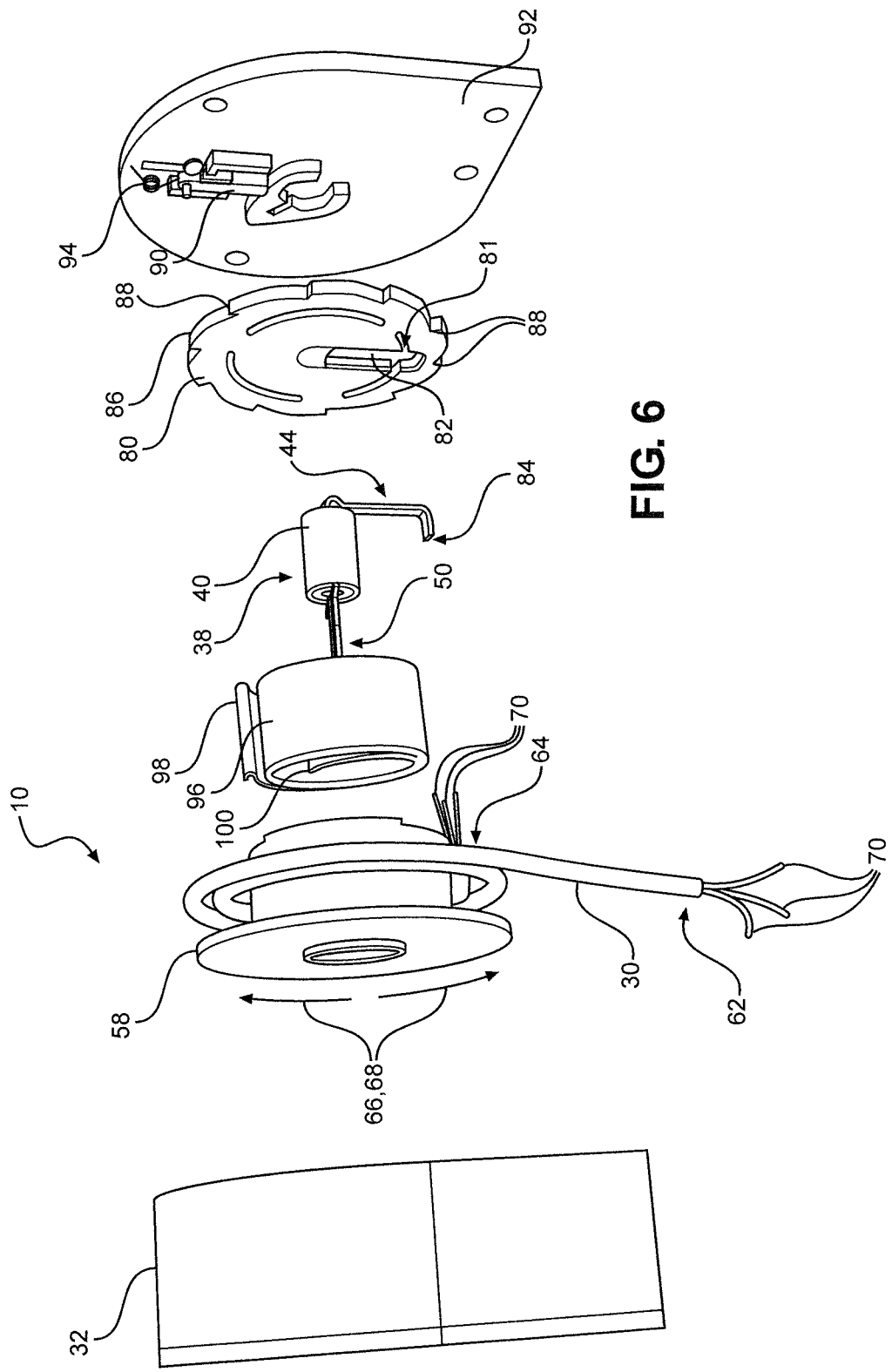
FIG. 6 is a schematic illustration of the extraction and retraction device of FIG. 1 in a partially exploded view, shown from another angle.

FIG. 6 illustrates another partially exploded view of the extension and retraction device 10 from a different angle. With reference to FIG. 6, the extension and retraction device 10 includes a sprocket 80 connected to the reel 58, where the ends 84 of the rotor leads 44 are connected to corresponding internal wires 70 of the cord 30. The sprocket 80 includes a guide 81 in which the guide comprises elongated aperture or slot 82 directing the rotor leads 44 from the slip ring 38 to a location proximate the proximal end 64 of the cord 30. The slot 82 extends radially from the central axis of the sprocket 80 towards the outer circumference of the sprocket. When the reel 58 rotates, the sprocket 80 rotates with the reel. Moreover, the rotor leads 44 are disposed in the slot 82 and rotate around the central axis of the slip ring 38 with the sprocket 80 and reel 58. Hence, the rotor leads 44 can be maintained in electrical connection with corresponding wires 70 of the cord 30 as the reel 58 rotates. Alternatively, the guide 81 includes a tubular structure provided on the sprocket 80 with the rotor leads 44 inserted therethrough, instead of a slot 82 for directing the rotor leads to a location proximate the proximal end 64 of the cord 30. Alternatively, the guide 81 may comprise brackets.

The sprocket 80 includes an outer periphery 86 having notches 88 defined there around. In particular, the notches 88 are defined in the outer periphery 86 at a predefined interval such that the notches are spaced at a substantially equal distance from one another. The extension and retraction device 10 further includes a slider 90 moveable between first and second positions within the housing 32. When the slider 90 is at one of the positions, the slider 90 engages a notch 88 in the sprocket 80 preventing rotation of the sprocket in at least one of the directions 66 and 68. In the other position, the slider 90 permits the sprocket to rotate in either direction 66 and 68. The slider 90 mounts to an interior side 92 of the housing 32. A spring 94 or other resiliently deformable member 94 biases the slider 90 to remain in one of the positions.

The extension and retraction device 10 includes a torsion spring 96 or resiliently deformable member connected to the reel 58. One end of the torsion spring 98 connects to the reel 58, and the other end 100 connects to a post or axle 102 about which the reel rotates (see FIG. 1). The opening 34 from the housing 32 is formed centrally through the axle 102 to the exterior of the housing. The torsion spring 96 biases the reel 58 against unwinding the cord 30 from the reel. To unwind the cord 30, one pulls the cord from the reel 58 to overcome the bias of the torsion spring 96.

Returning to FIG. 2, the stator leads 50 extend through the opening 34 in the housing 32 for connection to the entertainment system 12. The connection 106 may be of any known type, but preferably includes a locking mechanism to prevent inadvertent disconnection and environmental sealing. Locking mechanisms include connectors having locking levers of various types, threaded fastener locking, toggle or bayonet locking, plug and socket connectors, or other types.

As described earlier, the slip ring 38 includes at least four rotor and stator leads 44 and 50 for compatibility with at least USB 2.0. Hence, power may be supplied from the entertainment system 12 to the PCU 20, and data may be communicated to and from the PCU or other device to the entertainment system 12. The extension and retraction device 10 may be used to connect the PCU 20 or other device to a monitor 16. For instance, the monitor 16 may include USB ports, to which the extension and retraction device 10 connects via the stator leads 50 extending from the housing 32.

An advantage of the extension and retraction device 10 is that it reduces the amount of cord 30 required, and thereby weight and cost. Prior extension and retraction devices, such as that disclosed in U.S. Pat. No. 8,387,763, employ an arrangement having a cord including a retractable coil wound around a spool in a first chamber, and the cord including an expandable coil wound around the spool in a second chamber. During retraction of the cord from the first chamber, the expandable coil expands towards the perimeter of the second chamber, after which, the expandable coil winds back into the core of the second chamber wound in a direction opposite that which it began. In comparison, the retraction device 10 eliminates the need for multiple chambers, and reduces the length of cord required as the cord does not require a retractable and expandable coils. Further, the device 10 provides a less complex arrangement having improved reliability as the device does not include require multiple chambers and reduces the chance of a cord becoming jammed in one of the chambers.

Various changes and modifications can be made as will be recognized by those of ordinary skill in the art. While the extension and retraction device 10 has been described for electrical connection to a vehicle 12, it could be used for stationary applications as well, such as at kiosks. The cord 30 has been illustrated as round, however a flat cable could be alternatively employed. Instead of a slider 90 for engaging notches 88 of a sprocket 80, a pivotable lever or latch could be used for engagement of the notches. Instead of a slot 82 for guiding the rotor leads 44, the rotor leads could fastened to the sprocket 80 and the slot eliminated, or a tubular structure provided on the sprocket for guiding the rotor leads therethrough as described earlier. Instead of connecting the device 10 to an entertainment system 10 of a vehicle 14, the device could be connected to a power supply of the vehicle for providing an extendable and retractable charging cable for PEDs.

As changes can made, the foregoing disclosure and examples described therein are to be considered as illustrative and not restrictive and the invention is not to be limited to the details given herein, but may be modified within the scope and equivalence of the appended claims.

The invention claimed is:

1. A method for providing a retractable and extendable electrical connection to an entertainment system of a vehicle, the method comprising:

providing in the vehicle, a housing including a pair of openings;

mounting a slip ring within the housing in which the slip ring includes a rotor, a stator having stator leads, and extending the stator leads out of one of the openings of the housing and connecting the stator leads to the entertainment system of the vehicle;

rotatably mounting a reel within the housing with the reel having an axis of rotation along that of the rotor in which the reel is rotatable in opposite directions;

providing a cord on the reel including opposite ends and internal wires, and extending one end of the cord through the other of the pair of openings of the housing and connecting at least some of the wires to the rotor leads; and retracting the cord into the housing by rotating the reel in one direction to wind the cord onto the reel, extending the cord from the housing by pulling the cord to rotate the reel in the other direction and unwinding the cord from the reel; and encapsulating the slip ring.

2. The method of claim 1, further comprising:

attaching a sprocket to the reel with the sprocket rotatable with the reel, and the sprocket including an elongate aperture; and inserting the rotor leads into the elongate aperture and using the elongate aperture to guide the rotor leads from the slip ring to a location in the vicinity of said one end of the cord.

3. The method of claim 2, further comprising:

connecting a resiliently deformable member to the reel in which the resiliently deformable member biases the reel to rotate in a direction retracting the cord.

4. The method of claim 1, wherein said encapsulating includes placing the slip ring in an enclosure with the stator leads extending from the enclosure.

5. The method of claim 1, wherein said mounting a slip ring includes using a slip ring compatible with at least one USB standard for communicating data from the cord to the IFE system.

6. The method of claim 1, further comprising connecting the other end of the cord to a personal control unit.

* * * * *